(12) United States Patent
Uozumi et al.

(10) Patent No.: US 10,256,483 B2
(45) Date of Patent: Apr. 9, 2019

(54) METHOD FOR MANUFACTURING FUEL CELL ASSEMBLY

(71) Applicant: HONDA MOTOR CO., LTD., Tokyo (JP)

(72) Inventors: Ryo Uozumi, Tochigi (JP); Hiroshi Sekiguchi, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 81 days.

(21) Appl. No.: 15/405,538

(22) Filed: Jan. 13, 2017

(65) Prior Publication Data
US 2017/0222234 A1    Aug. 3, 2017

(30) Foreign Application Priority Data
Jan. 28, 2016  (JP) .................................. 2016-013976

(51) Int. Cl.
*B29C 65/00* (2006.01)
*B29C 65/18* (2006.01)
(Continued)

(52) U.S. Cl.
CPC ........... *H01M 8/0286* (2013.01); *B29C 65/18* (2013.01); *B29C 65/242* (2013.01); *B29C 65/305* (2013.01); *B29C 65/7841* (2013.01); *B29C 66/1222* (2013.01); *B29C 66/1224* (2013.01); *B29C 66/322* (2013.01); *B29C 66/324* (2013.01); *B29C 66/347* (2013.01); *B29C 66/43* (2013.01); *B29C 66/723* (2013.01); *B29C 66/727* (2013.01); *B29C 66/73182* (2013.01); *B29C 66/81427* (2013.01); *B29C 66/81815* (2013.01); *B29C 66/81831* (2013.01); *B29C 66/8322* (2013.01); *B29C 66/9192* (2013.01); *B29C 66/91421* (2013.01); *B29C 66/91941* (2013.01); *B29C 66/91943* (2013.01); *B29C 66/91945* (2013.01); *H01M 8/0273* (2013.01); *H01M 8/0276* (2013.01);
(Continued)

(58) Field of Classification Search
None
See application file for complete search history.

(56) References Cited

U.S. PATENT DOCUMENTS
2015/0064600 A1    3/2015  Katsuno et al.

FOREIGN PATENT DOCUMENTS
JP        5620011       9/2014
WO    WO 2013/069491  *  1/2013  ............. H01M 8/10

* cited by examiner

*Primary Examiner* — Maria Laios
(74) *Attorney, Agent, or Firm* — Rankin, Hill & Clark LLP

(57) ABSTRACT

A method for manufacturing a fuel cell assembly includes: arranging an end face of a gas diffusion layer on a placement jig in a state abutting an end face of a resin frame; melting a part of the frame member and causing to penetrate into the gas diffusion layer by pressurizing the projecting part by way of a heat-transfer member, and heating the projecting part via the heat-transfer member by abutting a heating member against of the heat-transfer member; and solidifying the part of the resin frame having penetrated into the gas diffusion layer, in which an abutting position of the heating member relative to the heat transfer member is set in the melting step so that a central axis of the heating member is positioned more to a side of the gas diffusion layer than the central axis of the projecting part.

4 Claims, 7 Drawing Sheets

(51) Int. Cl.
  *B29C 65/24* (2006.01)
  *B29C 65/30* (2006.01)
  *B29C 65/78* (2006.01)
  *B29L 31/34* (2006.01)
  *H01M 8/242* (2016.01)
  *H01M 8/0273* (2016.01)
  *H01M 8/0276* (2016.01)
  *H01M 8/0286* (2016.01)

(52) U.S. Cl.
  CPC ......... *H01M 8/242* (2013.01); *B29C 66/1282* (2013.01); *B29C 66/12841* (2013.01); *B29C 66/72323* (2013.01); *B29C 66/7444* (2013.01); *B29C 66/8167* (2013.01); *B29L 2031/3468* (2013.01); *Y02P 70/56* (2015.11)

METHOD FOR MANUFACTURING FUEL CELL ASSEMBLY

This application is based on and claims the benefit of priority from Japanese Patent Application No. 2016-013976, filed on 28 Jan. 2016, the content of which is incorporated herein by reference.

BACKGROUND OF THE INVENTION

Field of the Invention

The present invention relates to a method for manufacturing a fuel cell assembly that obtains a fuel cell assembly by joining a resin member and a membrane electrode assembly having an electrode containing a porous member.

Related Art

Conventionally, technology related to a manufacturing method of fuel cell assemblies has been known that joins a resin frame to a membrane electrode assembly (MEA). For example, Japanese patent publication No. 5620011 (hereinafter, "Patent Document 1") is given as a document disclosing this type of technology. Patent Document 1 discloses, in regards to a method for producing a joined assembly including: a step of forming an abutting portion by causing edge parts of a porous member and a resin member to oppose each other on a positioning jig; a step of pressing the abutting portion with a heat-transfer member; and a step of abutting a heating member against the heat-transfer member pressing the abutting portion, a technique of preforming a protrusion in the vicinity of an edge of the resin member and a recess in the vicinity of this protrusion, and upon causing the protrusion to flow, receiving a part thereof in the recess.

SUMMARY OF THE INVENTION

With Patent Document 1, by providing the protrusion and recess in the resin member, although the generation of burrs can be suppressed by the molten resin being captured in the recess, in the case of the relative position of the heating member in relation to the protrusion shifting due to dimensional error in the resin frame, etc., there has been concern over burrs generating by the flow excess of molten resin reaching an outer side of the recess due to the position of the heating member. In this way, there has been margin for improvement in the point of more reliably preventing the generation of burrs in the conventional technology.

The present invention has an object of providing a method for manufacturing a fuel cell assembly that can effectively prevent a situation where a resin member melted during the joining of a MEA and a resin member becomes a cause of burrs.

The present invention relates to a method for manufacturing a fuel cell assembly (e.g., the fuel cell assembly 1 described later) that is obtained by joining a resin member (e.g., the resin frame 150 described later) and an membrane electrode assembly (e.g., MEA 100 described later) having an electrode (e.g., the anode-side electrode 130 described later) containing a porous member (e.g., the gas diffusion layer 132 described later), the method including the steps of: arranging an end face of the porous member on a placement jig (e.g., the placement jig 11 described later) in a state abutting an end face of the resin member having a projecting part (e.g., the projecting part 152 described later) formed along the end face thereof; melting a part of the resin member and causing to penetrate into the porous member by pressurizing the projecting part by way of a heat-transfer member (e.g., the heat-transfer member 20 described later), and heating the projecting part via the heat-transfer member by abutting a heating member (e.g., the heating member 30 described later) at an opposite side to a side contacting the projecting part of the heat-transfer member; and solidifying the part of the resin member having penetrated into the porous member, in which an abutting position of the heating member relative to the heat-transfer member is set in the melting step so that a center of the heating member (e.g., the central axis C1 described later) is positioned more to a side of the porous member than a center of the projecting part (e.g., the central axis C2 described later).

Since the center of the heating member is thereby positioned more to the side of the porous member than the center of the projecting part, the opposite side to the porous member from the projecting part has relatively lower temperature, while the temperature on the side of the porous member from the projecting part becomes higher. Given this, the resin member having melted in the melting step has higher fluidity at the side of the porous member, and favorably penetrates into the porous member, as well as the fluidity relatively declining at the opposite side to the porous member; therefore, it is possible to effectively prevent a situation in which the molten resin excessively flows to the opposite side to the porous member and forms burrs on the resin member. In addition, even if there is a dimensional error in the shape of the projecting part that is the melting target, it is possible to reliably prevent the generation of burrs caused by a dimensional error in the shape of the projecting part, by the center of the heating member being positioned more to the side of the porous member than the center of the projecting part.

It is preferable for a capturing recessed part (e.g., the capturing recessed part 153 described later) to be formed on an opposite side of the projecting part to the porous member in the resin member, and the heat-transfer member to be foamed in a size so that a contact face (e.g., the contact face 21 described later) thereof with the resin member can seal the capturing recessed part in the melting step.

Since it is thereby possible to plug up the capturing recessed part by the heat-transfer member, the resin member melted in the melting step is caught by the capturing recessed part, and it is possible to reliably prevent a situation in which the caught molten resin overflows from the capturing recessed part and flows out to the opposite side to the porous member.

According to the present invention, it is possible to provide a method for manufacturing a fuel cell assembly that can effectively prevent a situation where a resin member melted during joining of a membrane electrode assembly and resin member becomes a cause of burrs.

DETAILED DESCRIPTION OF THE INVENTION

Figure 1:
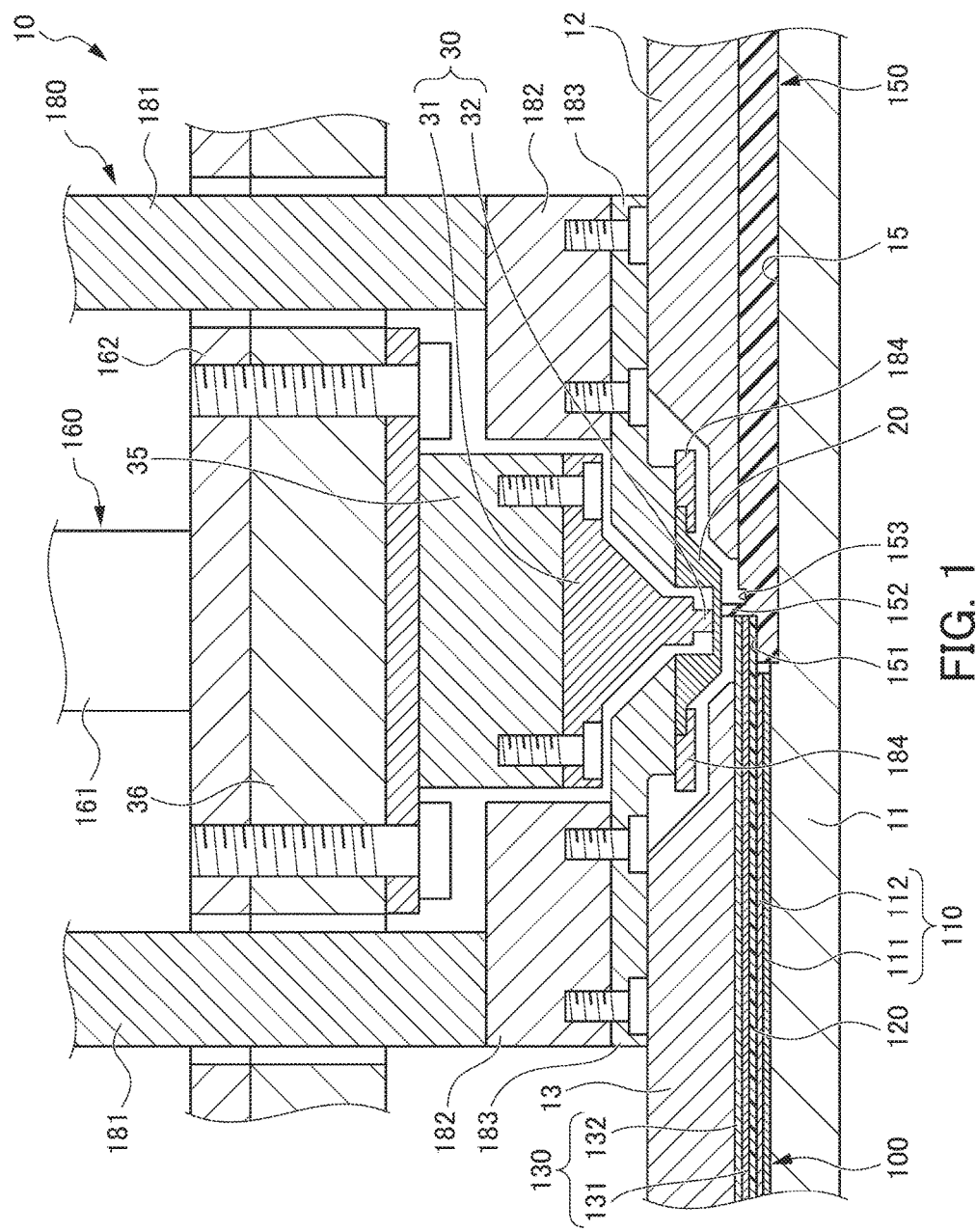
FIG. 1 is a cross-sectional view schematically showing a joining device according to a first embodiment of the present invention.
Figure 2:
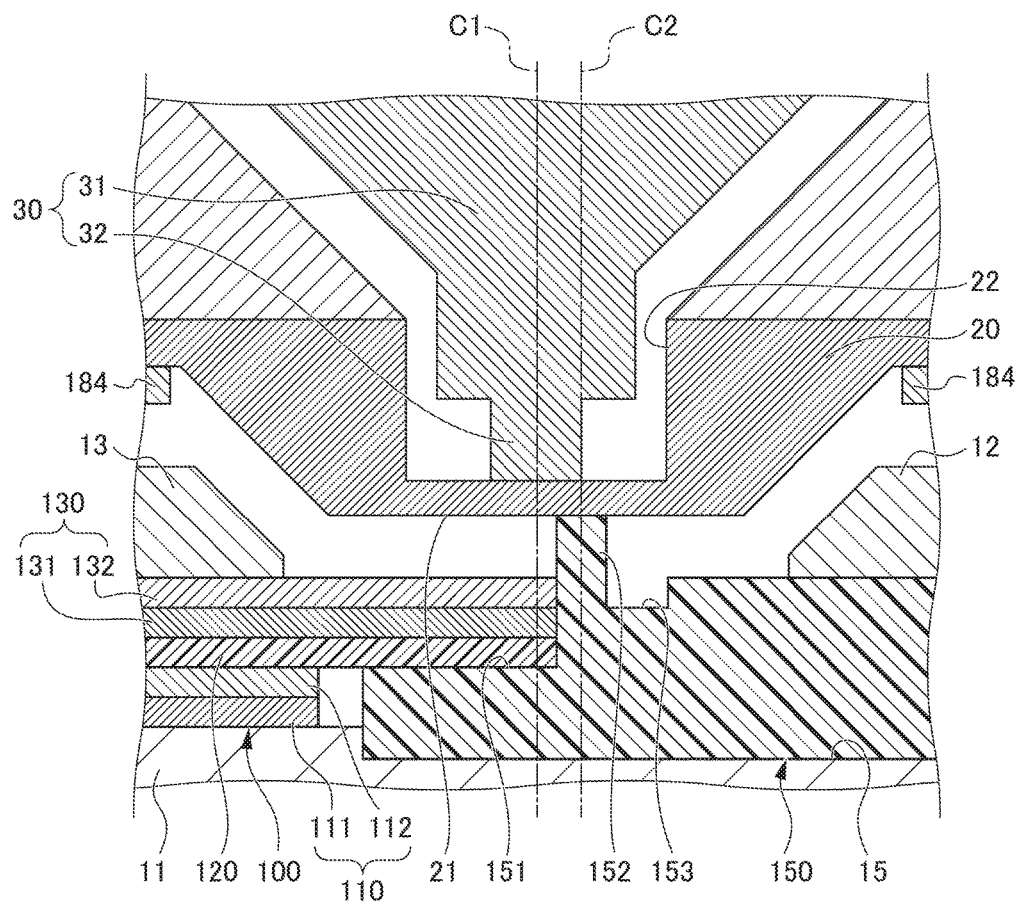
FIG. 2 is an enlarged cross-sectional view showing the configurations of a heat-transfer member and heating member of the present embodiment.

Hereinafter, a preferred embodiment of the present invention will be explained while referencing the drawings. FIG. 1 is a cross-sectional view schematically showing a joining device 10 according to an embodiment of the present invention. FIG. 1 shows a main section of the joining device 10. FIG. 2 is an enlarged cross-sectional view showing the configurations of a heat-transfer member 20 and heating member 30 of the present embodiment.

As shown in FIG. 1, the joining device 10 of the present embodiment includes a placement jig 11, frame restraining member 12, MEA restraining member 13, heat-transfer member 20 and heating member 30.

The placement jig 11 has the membrane electrode assembly (MEA) 100 and resin frame 150 placed on the top face thereof. A recess 15 for setting the resin frame 150 is famed in the placement jig 11. The MEA 100 is placed on the placement jig 11 in a state in which the outside face thereof is surrounded by the inside face of the resin frame 150.

A first coolant passage (not illustrated) is famed in the placement jig 11 of the present embodiment, and a cooling medium is flowed through this first coolant passage, whereby cooled solidifying of the resin frame 150 which is soft or melted is promoted.

The configuration of the MEA 100 of the present embodiment will be explained. The MEA 100 is a laminated body of a cathode-side electrode 110, electrolyte membrane 120 and anode-side electrode 130.

The cathode-side electrode 110 is configured by a gas diffusion layer 111 as a porous member consisting of carbon paper, etc.; micro porous layer (omitted from illustration); and electrode contact layer 112 being laminated in order from the bottom. In addition, the anode-side electrode 130 is configured by an electrode contact layer 131, micro porous layer (omitted from illustration), and gas diffusion layer 132 as a porous membrane consisting of carbon paper, etc. being laminated in order from the bottom.

The electrolyte membrane 120 is in a state sandwiched by the electrode contact layer 112 of the cathode-side electrode 110 arranged on the lower side and the electrode contact layer 131 of the anode-side electrode 130 arranged at the upper side. In the present embodiment, the cathode-side electrode 110 is formed to be smaller than the anode-side electrode 130 and electrolyte membrane 120.

The resin frame 150 as a resin member of the present embodiment will be explained. The resin frame 150 is a rectangular frame surrounding the MEA 100.

The resin frame 150 has a notched part 151 famed to an inner side of the top face thereof. An end on the outer side of the electrolyte membrane 120 is placed on a top face of this notched part 151. It should be noted that the inner side referred to herein is a side of the anode-side electrode 130 (gas diffusion layer 132), and is the left side in the drawings.

At the periphery on the outer side of the notched part 151, a projecting part 152 and capturing recessed part 153 are famed. It should be noted that outer side referred to herein is the opposite side in the left-right direction to the side on which the anode-side electrode 130 is arranged, and is the right side in the drawings.

The projecting part 152 is famed in a frame shape surrounding the notched part 151 in a plan view. The capturing recessed part 153 is famed more to the outer side than the projecting part 152, and makes a frame-shaped groove that surrounds the projecting part 152.

The frame restraining member 12 is famed in a frame shape according to the shape of the resin frame 150. The frame restraining member 12 is configured to be liftable. The top face of the resin frame 150 is restrained by this frame restraining member 12.

The MEA restraining member 13 is famed in a substantially square shape, and is arranged at an inner side of the frame restraining member 12. A gap is famed between the MEA restraining member 13 and the frame restraining member 12, and a portion bringing face-to-face the outside face of the MEA 100 and the inside face of the resin frame 150 is positioned in this gap portion. The top face of the MEA 100 is restrained by this MEA restraining member 13.

As shown in FIG. 2, a contact face 21 of the heat-transfer member 20 is famed in a size capable of covering the capturing recessed part 153 of the resin frame 150. In addition, as shown in FIG. 1, the heat-transfer member 20 is supported by a holder 180 having a positioning function. The position at which the heat-transfer member 20 contacts the resin frame 150 is positioned by this holder 180. The holder 180 of the present embodiment includes a columnar member 181, cooling block 182 and cooling conduction block 183, and restraining plate 184.

The columnar member 181 is connected to a liftable support plate (not illustrated), and movement of this support plate interlocks. The heat-transfer member 20 moves up and down accompanying the lifting operation of the columnar member 181.

The cooling block 182 and cooling conduction block 183 are provided to a leading end of the columnar member 181. In the present embodiment, the cooling block 182 is arranged at the leading end of the columnar member 181, and the cooling conduction block 183 is arranged at a lower end of the cooling block 182.

A second coolant passage (not illustrated) is formed in the cooling block 182. By cooling medium being flowed through the second coolant passage along with the first coolant passage, the cooling block 182, cooling conduction block 183 and heat-transfer member 20 are cooled. Since it is thereby possible to cause the temperature of this heat-transfer member 20 to rapidly lower after separating the heating member 30 from the heat-transfer member 20, it is possible to much further improve the cooled solidifying of the resin frame 82 that is softened or melted.

A hollow part in communication with the recess 22 described later is formed at an inner side of the cooling conduction block 183. A restraining plate 184 is provided to a leading end of the cooling conduction block 183. The heat-transfer member 20 is retained by this restraining plate 184.

As shown in FIG. 2, the heat-transfer member 20 has a recess 22 for abutting the heating member 30 foamed on the opposite side to the contact face 21 contacting the resin frame 150.

The heating member 30 includes a main body 31 foamed so as to taper off as approaching the lower side, and an abutting part 32 foamed at the leading end of the main body 31. The main body 31 is coupled to the heating block 35 as a heat source. A cartridge heater that is not illustrated is embedded in this heating block 35, and the heat from the cartridge heater is transferred to the heating member 30 via the heating block 35. In the present embodiment, the abutting part 32 of the heating member 30 contacts the bottom face of the recess 22 of the heat-transfer member 20, whereby heat from the heating member 30 becomes transmittable to the resin frame 150 via the heat-transfer member 20.

Next, a support structure of the heating member 30 will be explained. The heating member 30 is supported by a holder 160 of a different member from the heat-transfer member 20, and is made so as to enable changing of position relative to the heat-transfer member 20. In addition, the holder 160 of the present embodiment has a positioning mechanism (not illustrated), and is configured so as to be able to perform highly accurate positioning of the heating member 30 by way of this holder 160. It should be noted that, as the positioning mechanism, it is possible to employ an appropriate mechanism such as one made using a jig that can positionally adjust the heating member 30 in plane or three-dimensionally, or one made using a mobile mechanism.

The holder 160 of the present embodiment includes a columnar member 161, support plate 162, and insulating plate 36. The columnar member 161 has an upper end thereof connected to the lifting mechanism (not illustrated), and a lower end thereof connected to the support plate 162. The support plate 162 is coupled to the heating block 35 via the insulating plate 36. A situation in which the temperature of the support plate 162 excessively rises is prevented by the insulating plate 36.

In the present embodiment, it is made possible to relatively displace the position of the heating member 30 relative to the heat-transfer member 20, by having separate lifting mechanisms for each of the holder 180 supporting the heat-transfer member 20 and the holder 160 supporting the heating member 30. In addition, it is possible to adopt an applied method such as using a load sensor for whether or not the heat-transfer member 20 is abutting the resin frame 150.

As shown in FIG. 2, for the heating member 30 of the present embodiment, the position thereof is set so that the central axis C1 of the abutting part 32 thereof is offset to the inner side (side of MEA 100) relative to the central axis C2 of the projecting part 152. In addition, for the heat-transfer member 20, the position thereof is set so that the contact face 21 thereof covers the area of the capturing recessed part 153.

Figure 3:
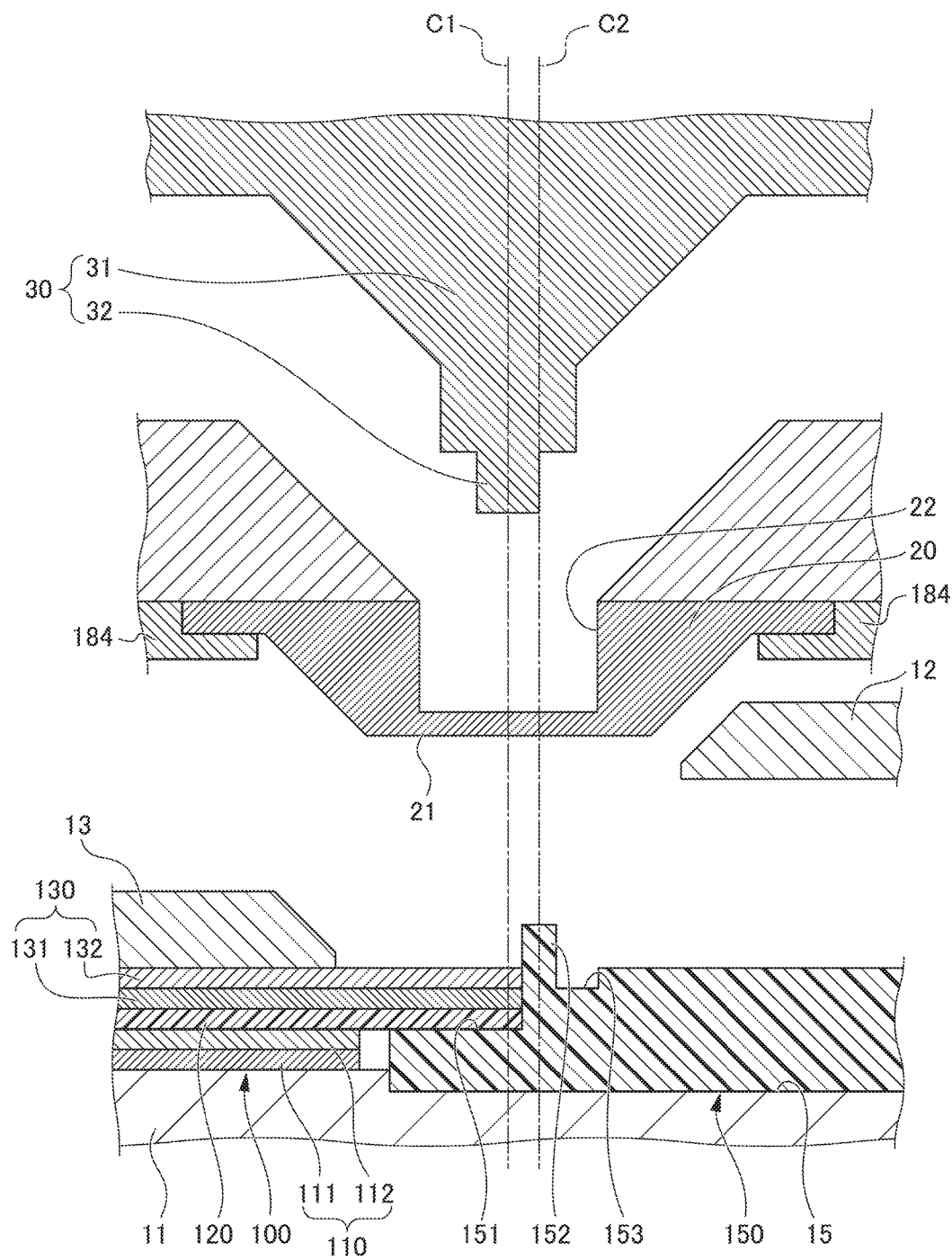
FIG. 3 is an enlarged cross-sectional view showing an aspect of a membrane electrode assembly and resin frame being set in a placement jig of the joining device of the present embodiment.

Next, a manufacturing process of the fuel cell assembly 1 using the joining device 10 of the present embodiment will be explained. FIG. 3 is an enlarged cross-sectional view showing an aspect of the MEA 100 and the resin frame 150 being set in the placement jig 11 of the joining device 10. As shown in FIG. 3, in an arranging step in which the membrane electrode assembly 10 and resin frame 150 are arranged in the placement jig 11, an end face of the resin frame 150 on a side at which the projecting part 152 is foamed, and an end face of the MEA 100 enter an associated state. In the present embodiment, it becomes a state in which the anode-side electrode 130 and the end of the electrolyte membrane 120 are positioned at the top face of the notched part 151.

In the arranging step, the heat-transfer member 20 and heating member 30 are retained above the MEA 100 and resin frame 150 in a separated state. From this state, it advances to the melting step. From the state shown in FIG. 3, the frame restraining member 12 is lowered to prevent positional displacement of the resin frame 150, and the heat-transfer member 20 and heating member 30 are lowered while maintaining the separated state. In addition, the cooling medium such as water or oil is made to flow through the first coolant passage and second coolant passage.

Figure 4:
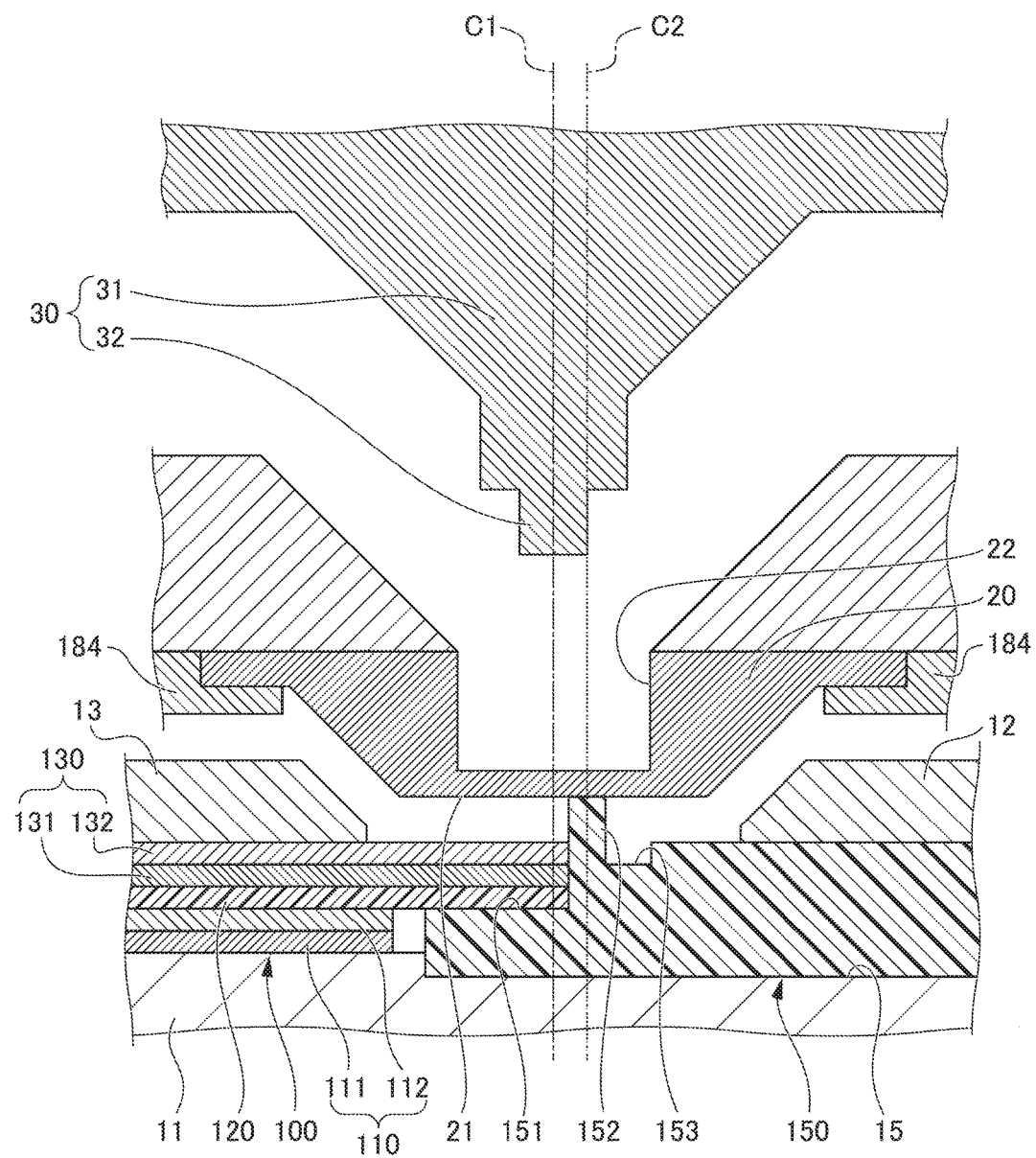
FIG. 4 is an enlarged cross-sectional view showing an aspect of a contact face of the heat-transfer member of the present embodiment abutting a top face of a projecting part.

FIG. 4 is an enlarged cross-sectional view showing an aspect of the contact face 21 of the heat-transfer member 20 abutting a top face of the projecting part 152. As shown in FIG. 4, it is a state in which the abutting part 32 of the heating member 30 is separated from the recess 22 of the heat-transfer member 20, at the moment when the contact face 21 of the heat-transfer member 20 contacts the top face of the projecting part 152. From this state, the heating member 30 is lowered.

Figure 5:
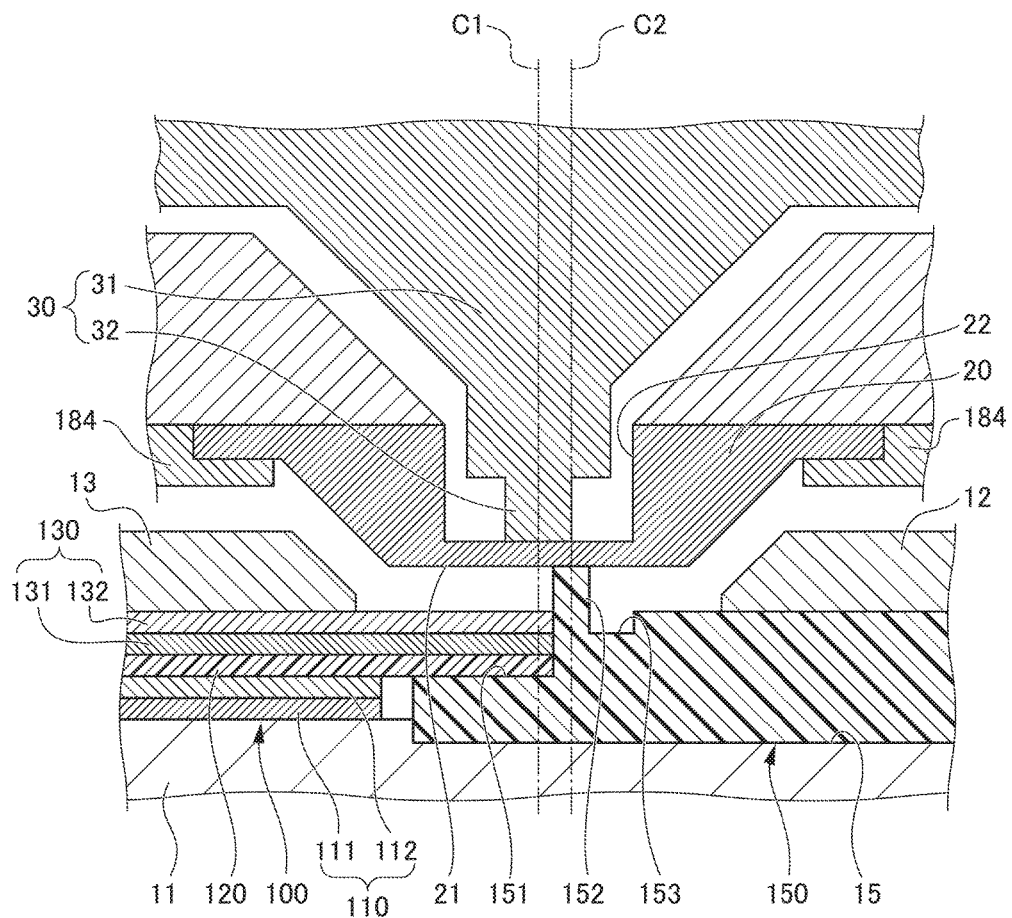
FIG. 5 is an enlarged cross-sectional view showing an aspect of the abutting part of the heating member of the present embodiment abutting a recess of the heat-transfer member.
Figure 6:
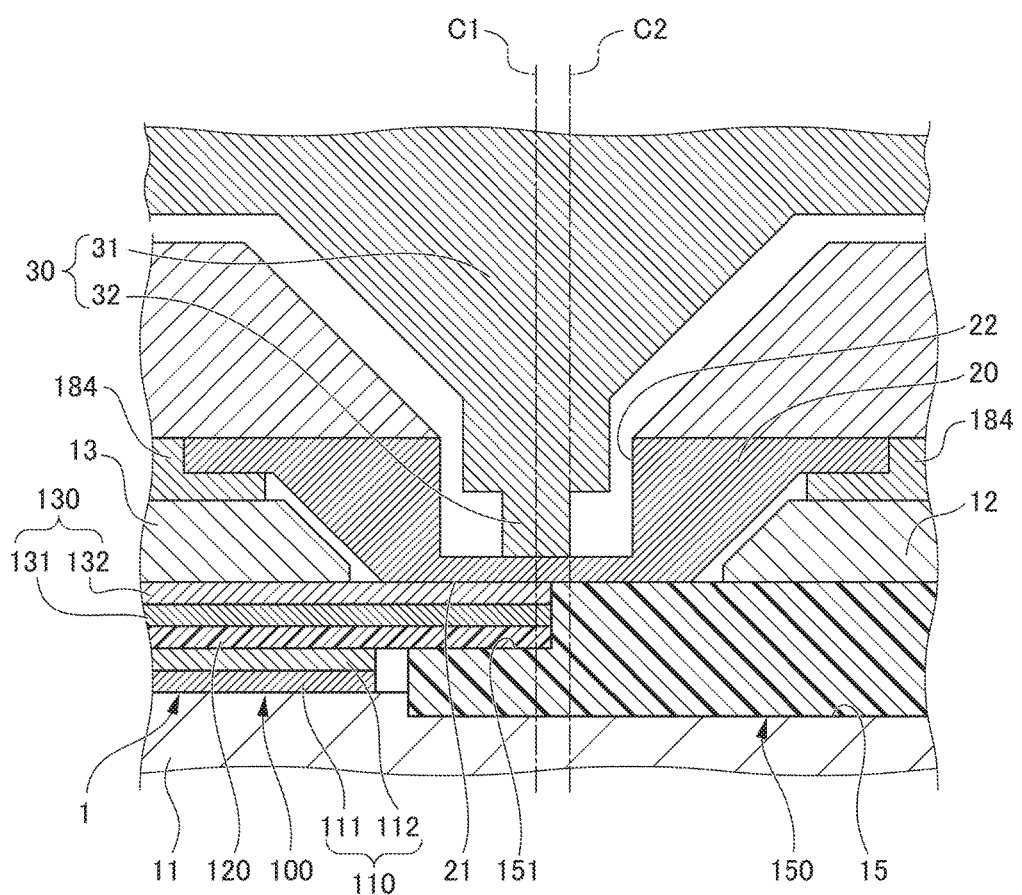
FIG. 6 is an enlarged cross-sectional view showing an aspect of a projecting part having melted in a melting step of the present embodiment.

FIG. 5 is an enlarged cross-sectional view showing an aspect of the abutting part 32 of the heating member 30 abutting the recess 22 of the heat-transfer member 20. FIG. 6 is an enlarged cross-sectional view showing an aspect of the projecting part 152 melting in the melting step.

As shown in FIG. 5, the heat from the heating member 30 becomes transmittable to the heat-transfer member 20 by way of the abutting part 32 of the heating member 30 entering a state touching the recess 22 of the heat-transfer member 20. The heat transmitted from the heating member 30 is transferred to the projecting part 152 via the heat-transfer member 20. The projecting part 152 melts and becomes a flowable soft material (or melt) by way of the heat transmitted via the heat-transfer member 20. As shown in FIG. 6, by the projecting part 152 becoming a soft material, the force towards below the heat-transfer member 20 and heating member 30 exceeds the counterforce of the projecting part 152 and the projecting part 152 is crushed.

The soft material at which the projecting part 152 has been crushed receives the pressure from the heat-transfer member 20, and flows from the position of the projecting part 152. In the present embodiment, the projecting part 152 is heated via the heat-transfer member 20 in a state in which the central axis C1 of the abutting part 32 of the heating member 30 is positioned more to a side of the MEA 100 than the central axis C2 of the projecting part 152. The temperature of the projecting part 152 on the side of the anode-side electrode 130 thereby becomes higher than the opposite side thereof in the melting step. Therefore, the fluidity of the melt is relatively higher at the anode-side electrode 130, and favorably penetrates the gas diffusion layer 132, which is a porous body.

In addition, the melt tends to flow to the side of the anode-side electrode 130, and the temperature on the opposite side to the side of the anode-side electrode 130 becomes relatively lower and thus the fluidity also declines; therefore, since the flow amount to the opposite side to the side of the anode-side electrode 130 decreases, a situation is prevented in which the melt of the projecting part 152 flows to the outer side past the capturing recessed part 153. Furthermore, since the contact face 21 of the heat-transfer member 20 enters a state plugging the capturing recessed part 153, a situation is also prevented of the melt overflowing from the capturing recessed part 153 after lowering of the heat-transfer member 20.

It should be noted that the MEA 100 and resin frame 150 are cooled by the cooling medium passing through the inside of the placement jig 11 in surface contact with the lower faces of each, and the temperature of portions other than the projecting part 152 and neighboring parts thereof is prevented from excessively rising, and thus it is possible to prevent a situation in which warping occurs in the MEA 100 or resin frame 150.

In the curing step, the soft material penetrating into the gas diffusion layer 132 is cooled, and the gas diffusion layer 132 (anode-side electrode 130) and resin frame 150 are integrally joined, whereby the fuel cell assembly 1 is obtained as a joining product.

The cooling block 182, cooling conduction block 183 and heat-transfer member 20 are raised so as to distance from the fuel cell assembly 1, as well as the frame restraining member 12 being raised so as to distance from the resin frame 150, to establish a state allowing to remove the fuel cell assembly 1 from the joining device 10.

Figure 7:
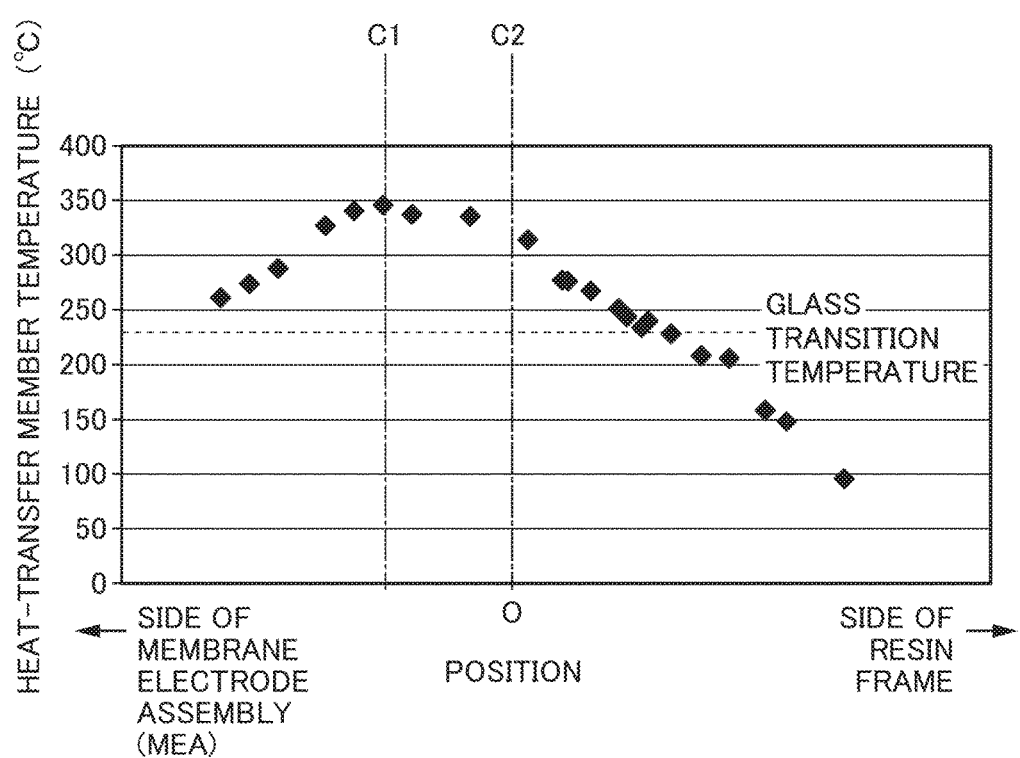
FIG. 7 is a graph showing an example of the temperature distribution of the heat-transfer member relative to a distance from the abutting part of the heating member in the melting step.

Next, temperature distribution of heat transfer by the heating member 30 via the heat-transfer member 20 will be explained. FIG. 7 is a graph showing an example of a temperature distribution of the heat-transfer member 20 in the melting step. In the example of FIG. 7, the position with the center of the projecting part 152 as the origin O is expressed on the horizontal axis, with the left side from the origin O on the horizontal axis being the side of the MEA 100, and the distancing from the MEA 100 being shown as moving to the right side. Then, the temperature (° C.) at each position of the heat-transfer member 20 is shown on the vertical axis.

C1 of the dotted line shown in the graph of FIG. 7 indicates the central axis C1 of the abutting part 32, and C2 of the dotted line indicates the central axis C2 of the projecting part 152. Also in the example of the graph shown in FIG. 7, the central axis C1 of the abutting part 32 is positioned to the side of the MEA 100 relative to the central axis C2 of the projecting part 152.

As shown in the graph of FIG. 7, by the central axis C1 of the abutting part 32 being offset more to the side of the MEA 100 than the central axis C2 of the projecting part 152, the temperature of the heat-transfer member 20 becomes high around the position corresponding to the central axis C1. On the other hand, at the opposite side to the side of the MEA 100 relative to the origin O, the temperature becomes lower than the glass transition point of the resin of the resin frame 150.

Also based on the example shown in FIG. 7, it is found that, by the high-temperature region becoming the side of the MEA 100, the projecting part 152 in a flowing state tends to flow to the side of the MEA 100, and in this way, it is possible to effectively prevent a situation in which the projecting part 152 flows to the side of the resin frame 150 and becomes a cause for burrs.

The offset amount between the central axis C1 of the heating member 30 and the central axis C2 of the projecting part 152 can be set based on the temperature distribution of the melting region. For example, it is possible to set the offset amount from the relationship between the setting position that does not cause the resin frame 150 to melt, and the temperature at which the resin frame 150 no longer melts. The setting of the offset amount may be appropriately done based on the material, etc. of the heating member 30, heat-transfer member 20 and resin frame 150. The setting of the offset amount can be appropriately changed according to the conditions.

According to the manufacturing method of the fuel cell assembly 1 of the present embodiment explained above, the following effects are exerted.

More specifically, the method for manufacturing the fuel cell assembly 1, which is obtained by joining the resin frame 150 and the MEA 100 having the anode-side electrode 130 containing the gas diffusion layer 132, includes: an arranging step of arranging an end face of the gas diffusion layer 132 on a placement jig 11 in a state abutting an end face of the resin frame 150; a melting step of melting a part of the frame member 150 and causing to penetrate into the gas diffusion layer 132 by pressurizing the projecting part 152 by way of the heat-transfer member 20, and heating the projecting part 152 via the heat-transfer member 20 by abutting a heating member 30 against an opposite side to the side contacting the projecting part of the heat-transfer member 20; and a solidifying step of solidifying the part of the resin frame 150 having penetrated into the gas diffusion layer 132, in which an abutting position of the heating member 30 relative to the heat transfer member 20 is set in the melting step so that a central axis C1 of the heating member 30 is positioned more to a side of the gas diffusion layer 132 than the central axis C2 of the projecting part 152.

Since the center of the heating member 30 is thereby positioned more to the side of the gas diffusion layer 132 than the center of the projecting part 152, the opposite side of the gas diffusion layer 132 from the projecting part 152 has relatively lower temperature, while the temperature on the side of the gas diffusion layer 132 from the projecting part 152 becomes higher. Given this, the resin frame 150 having melted in the melting step has higher fluidity at the side of the gas diffusion layer 132, and favorably penetrates into the gas diffusion layer 132, as well as the fluidity relatively declining at the opposite side to the gas diffusion layer 132; therefore, it is possible to effectively prevent a situation in which the molten resin excessively flows to the opposite side to the gas diffusion layer 132 and forms burrs on the resin frame 150. In addition, even if there is a dimensional error in the shape of the projecting part 152 that is the melting target, it is possible to reliably prevent the generation of burrs caused by dimensional error in the shape of the projecting part, by the central axis C1 of the heating member 30 being positioned more to the side of the gas diffusion layer 132 than the central axis C2 of the projecting part. Therefore, compared to a case of designing a resin frame in excess by considering the generation of burrs from molten resin, it is possible to design smaller dimensions since the generation of burrs can be prevented, and thus the degree of freedom in layout can also be improved.

In the present embodiment, the capturing recessed part 153 is foamed in the resin frame 150 on the opposite side to the gas diffusion layer 132 of the projecting part 152, and the heat-transfer member 20 is foamed in a size so that the contact face 21 with the resin frame 150 can seal the capturing recessed part 153 in the melting step.

Since it is thereby possible to plug up the capturing recessed part 153 by the heat-transfer member 20, the resin frame 150 melted in the melting step is caught by the capturing recessed part 153, and it is possible to reliably prevent a situation in which the caught molten resin overflows from the capturing recessed part 153 and flows out to the opposite side to the gas diffusion layer 132.

Although a preferred embodiment of the present invention has been explained above, the present invention is not to be limited to the aforementioned embodiment, and modifications are possible as appropriate. For example, the configuration of the resin frame 150 can be modified as appropriate according to the conditions, such as modifying the shape of the projecting part 152. In addition, the configuration of the MEA 100 is not necessarily limited to the gas diffusion layer. It is possible to apply the present invention to various membrane electrode assemblies made using porous members. Furthermore, it is possible to modify the configuration of the above-mentioned embodiment also for the joining device 10 according to the conditions.

What is claimed is:

1. A method for manufacturing a fuel cell assembly that is obtained by joining a resin member and a membrane electrode assembly having an electrode containing a porous member, the method comprising the steps of:

arranging an end face of the porous member on a placement jig in a state abutting an end face of the resin member having a projecting part formed along the end face thereof;

melting a part of the resin member and causing to penetrate into the porous member by pressurizing the projecting part by way of a heat-transfer member, and heating the projecting part via the heat-transfer member by abutting a heating member at an opposite side to a side contacting the projecting part of the heat-transfer member; and solidifying the part of the resin member having penetrated into the porous member, wherein an abutting position of the heating member relative to the heat-transfer member is set in the melting step so that a center of an abutting part in contact with the heat-transfer member of the heating member is positioned more to a side of the porous member than a center of the projecting part.

2. A method for manufacturing a fuel cell assembly according to claim 1, wherein a capturing recessed part is formed on an opposite side of the projecting part to the porous member in the resin member, and wherein the heat-transfer member is formed in a size so that a contact face thereof with the resin member can seal the capturing recessed part in the melting step.

3. A method for manufacturing a fuel cell assembly according to claim 1, wherein the center of the abutting part in contact with the heat-transfer member of the heating member has the highest temperature, in relation to temperature of the heat-transfer member.

4. A method for manufacturing a fuel cell assembly according to claim 1, wherein the center of the abutting part in contact with the heat-transfer member of the heating member is positioned more to a side of the porous member than the abutting part in contact with the heat-transfer member of the projecting part.

* * * * *